April 21, 1953 W. R. COYNE 2,635,560
DOUGHNUT CUTTER
Filed Jan. 19, 1950
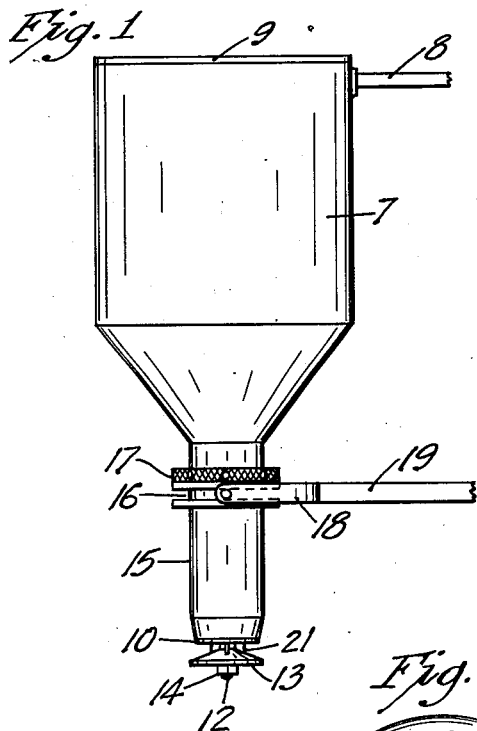
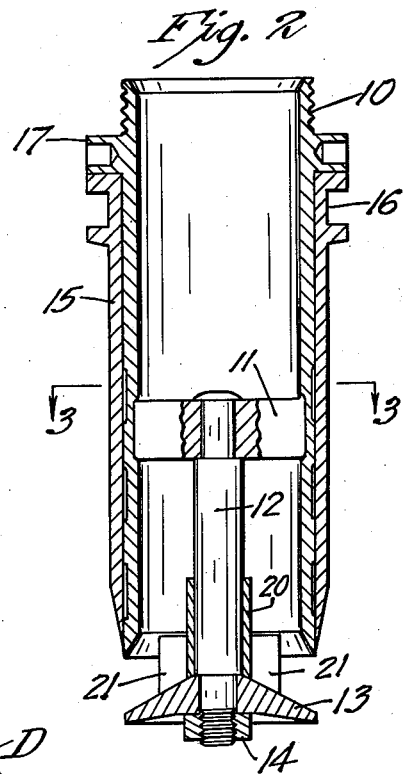
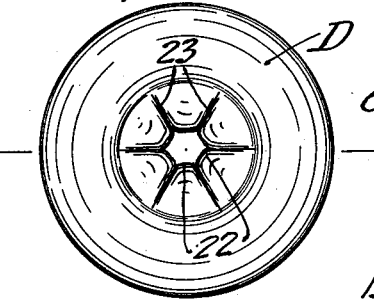
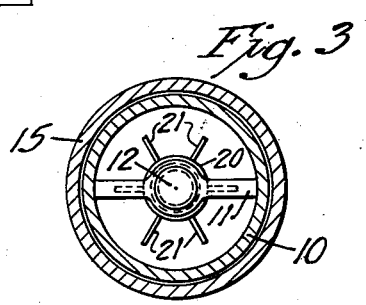
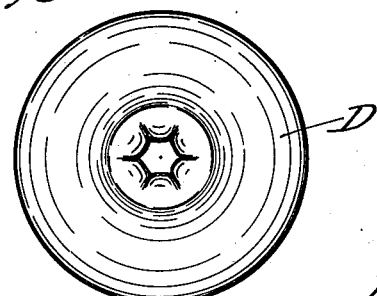
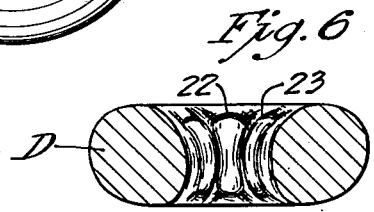
Inventor
William R. Coyne
By Williamson & Williamson
Attorneys Patented Apr. 21, 1953

2,635,560

UNITED STATES PATENT OFFICE 2,635,560

DOUGHNUT CUTTER

William R. Coyne, Minneapolis, Minn., assignor to Pillsbury Mills, Inc., Minneapolis, Minn., a corporation of Delaware Application January 19, 1950, Serial No. 139,335

7 Claims. (Cl. 107—14)

This invention relates to doughnut cutters, processes of producing doughnut dough formations, and doughnuts.

In the forming of doughnut dough formations from doughnut dough at the present time preparatory to the commercial cooking of doughnuts, dough cutters or formers are commonly employed including a spout through which the dough is extruded. Working in conjunction with this spout is a cut-off head which is located below or can be carried below the lower end of the spout to permit the extrusion of the dough in annular form between the spout and the cut-off head. In many of such cutters or formers there is also employed a reciprocating sleeve or other cut-off means which will cut or shear off the extruded annular dough formation to sever it from the main body of the dough. The doughnut dough formations cut by the cutter or former are carried or allowed to fall into a grease vat where the dough formations are cooked to produce doughnuts. As the doughnuts cook in the hot grease they expand and irregular cleavage cracks often occur at the central portion of the doughnut, the skin of the doughnut seems to harden relative to the remainder of the same, and in some instances it tends to break apart at the central part of the doughnut, giving the finished doughnut an irregular formation and in other instances the skin seems to prevent proper expansion and fullness taking place in the doughnut.

I have discovered that, if at the time the doughnut dough formation is cut by the cutter or former, cuts are made at the inner portion of the dough formation, these cuts which partially heal together as the doughnut is allowed to drop from the cutter will form weakened or cleavage points at the inner portion of the doughnut which permits proper expansion of the doughnut as it is cooked, a better cooking of the doughnut, and results in a larger doughnut being produced. Also, if the cuts are symmetrically arranged, a much more regular appearing doughnut is secured, giving the finished doughnut a much more pleasing appearance than the usual doughnut and commanding a better demand by the purchasing public than in the case of the irregular shaped doughnuts such as are produced at the present time.

It is, accordingly, one of the objects of the invention to provide a novel and improved process for forming uncooked doughnut dough formations which will produce weakened portions or expansion joints at the central portions of the doughnut dough formations which will permit the making of doughnuts of larger size than in the case of doughnuts heretofore produced.

A further object is to provide such a process which will produce doughnuts having a regular and pleasing appearance to the eye when the finished product is produced.

Still another object is to provide a finished cooked doughnut of plump appearance and regular shape.

Another object is to provide a cutting attachment which can be employed with an ordinary doughnut cutter or former to produce cuts through the inner walls of doughnut dough formations cut by the cutter of former.

The objects and advantages of the invention will more fully appear from the following description made in connection with the accompanying drawings wherein like reference characters refer to the same or similar parts throughout the various views, and in which Fig. 1 is a view in side elevation illustrating a typical doughnut cutter or former incorporating therein my novel cutting device, the said former being capable of use to carry out the processes of the invention;

Fig. 2 is a vertical section in enlarged scale taken through the discharge spout of the cutter or former shown in Fig. 1;

Fig. 3 is a horizontal section taken on the line 3—3 of Fig. 2 as indicated by the arrows;

Fig. 4 is a plan view looking toward the upper side of a cooked doughnut produced from one of the doughnut dough formations cut by the cutter or former shown in Figs. 1, 2 and 3;

Fig. 5 is a bottom plan view of the same doughnut; and

Fig. 6 is a vertical section through the doughnut taken substantially on the line 6—6 of Fig. 4 as indicated by the arrows.

Referring to the drawings, there is shown a typical doughnut cutter or former including a hopper 7 for containing a quantity of prepared doughnut dough and to which compressed air may be supplied at the top of the hopper as by means of a compressed air supply line 8. The hopper is customarily provided with a suitable top closure 9. Connected to the lower part of the hopper 7 is a cylindrical spout 10, the lower end of which is sharpened, being beveled from its internal side toward its external side. Supported in the discharge spout 10 by a spider 11 is a cut-off head spindle 12 which carries at its lower end below the lower end of the spout 10 a circular cut-off head 13, the particular head illustrated being fitted onto a reduced portion of the spindle 12 and held against the shoulder thereby formed by a nut 14 carried by the lower threaded end of the spindle. The cut-off head 13 has an upper surface of truncated conical shape and, of course, the spindle 12 and the cut-off head 13 are concentrically mounted relative to the spout 10. Slidably mounted on the spout 10 for reciprocating movement over the spout to carry the lower portion of the same from a point above the lower end of the spout 10 to a point surrounding and enclosing the outer edge of the cut-off head 13 is a cutter sleeve 15 having its lower edge sharpened and being beveled from its exterior surface to its interior surface. This cutter sleeve 15 as shown is provided with a grooved portion 16 adjacent its upper end to receive pins 17 carried by the forked end 18 of an operating lever 19 which will be swung through some source of power (not illustrated) to cause reciprocation of the cutter sleeve 15. The parts thus far described are of standard construction and typify an ordinary doughnut cutter or former such as is commonly employed today in the commercial production of doughnuts.

In accordance with the present invention there is provided a collar 20 of a size to loosely fit the cut-off head spindle 12 immediately above the cut-off head 13. This collar 20 carries near its lower portion a plurality of circumferentially spaced radially extending and vertically disposed blades 21. The blades 21 are preferably regularly arranged circumferentially of the collar 20 and preferably from three to eight of these blades are employed, there being six blades 21 provided in the illustrated embodiment. The blades 21, while they extend radially outwardly from the collar 20, terminate short of the inner side of the spout 10, the lower portions of the blades at least extending approximately half way across between the collar 20 and the inner wall of the spout 10. Preferably the lower edges of the blades 21 are angularly cut as shown to rest directly on the upper conical surface of the cut-off head 13. The outer edges of the blades 21 may be vertically disposed, although this is not essential. The blades 21 preferably run up from the upper surface of the cut-off head 13 to a point somewhat above the lower end of the spout 10.

In forming the annular doughnut dough formations which are to be cooked into doughnuts, the hopper 7 is, of course, filled with doughnut dough and pressure is applied against the upper surface of the dough within the hopper 7 in any manner as by the compressed air supplied through the line 8, the pressure applied to the dough tending to extrude the same through the spout 10. At a proper time interval the operating lever 19 will move to raise the cutter sleeve 15 to the raised position illustrated in Fig. 2, whereupon an annular dough formation will be extruded outwardly between the lower edge of the spout 10 and the cut-off head 13. As this dough is extruded in this manner, the blades 21 will cut through the inner central portion of the extruded annular formation to produce a number of regular radial vertical cuts in the dough. After the cutter sleeve 15 has been held in raised position for the proper interval the lever 19 again actuates the cutter sleeve 15 to cut through the extruded dough formation, severing it from the body of dough within the spout 10 and forming a doughnut dough formation of annular shape. This doughnut dough formation will, of course, have radial cuts at regular spaced intervals extending vertically through the inner portions thereof, although these cuts will partially seal together and heal. However, these cuts form weakened portions at the inner part of the doughnut dough formation or what I choose to call expansion joints or cleavage cracks.

As the doughnut dough formation is severed it, of course, drops from the cutter or former and will normally be carried directly into the cooking fat or thereafter be transferred thereto. The doughnut dough formation is thereafter cooked in the hot grease for the proper interval on one side and it is then turned over to cook on the other side, whereupon when the cooking is completed it is ejected from or removed from the cooking grease.

During the cooking period the doughnut dough formation expands rapidly, this expansion taking place both radially inwardly and radially outwardly. The cleavage cracks or cuts formed in the doughnut dough formation permit radial expansion inwardly to readily take place along these cleavage lines while exposing a greater surface area of the doughnut dough formation to the action of the cooking grease. As a result the doughnut is permitted to expand to a larger size than is customary, the doughnut is better cooked throughout and when the cooking process has been completed a doughnut is produced of comparatively regular formation in comparison to the ordinary doughnut.

In Figs. 4, 5 and 6, one of the cooked doughnuts D produced in accordance with my process and from use of my apparatus is shown, the illustrated doughnut being typical in appearance of those obtained. It will be noted that this doughnut has inner fingers 22 between which are radially extending cuts or slits 23. The fingers and slits are not as pronounced on the side of the doughnut shown in Fig. 5 as on the side of the doughnut shown in Fig. 4, the side shown in Fig. 4 being that side of the doughnut which is first immersed and cooked in the grease. The cuts 23 produce a star-shaped pattern at the center of the doughnut which gives the same a regular and pleasing appearance.

The cutter device formed by the collar 20 and blades 21 may take various shapes and it will, of course, be understood that it may be used with doughnut cutters or formers of different type from that illustrated.

It will be seen that a simple but effective process has been provided for increasing the size of the doughnuts, for securing a more evenly cooked doughnut, and for producing a doughnut of regular and pleasing appearance. It is of importance that at least three blades 21 be employed and that at least three slits 23 be cut in the doughnut formation if the regular circular exterior shape of the cooked doughnut is to be obtained. If but two opposed blades 21 are employed and but two slits are thus formed in the doughnut dough formation the doughnut will elongate to produce an ellipse shape doughnut during the cooking process.

It will, of course, be understood that various changes may be made in the form, details, arrangement, and proportions of the various parts of the device of the invention and that variations may be made in the steps and processes thereof without departure from the scope of the present invention, which, generally stated, consists in the matter shown, and described, and set forth in the appended claims.

What I claim is:

1. A device adapted to produce expansion joints at the central portions of dough formations produced by doughnut formers and adapted to be carried by the cut-off head spindle mounted in the spout of a reciprocating sleeve doughnut former, comprising a collar for encircling the spindle immediately above the cut-off head and a multiplicity of circumferentially spaced vertical blades extending outwardly from said collar.

2. The structure defined in claim 1, said blades being radially disposed.

3. The structure defined in claim 1, said blades being of a length to extend outwardly from said collar to points somewhat inwardly spaced from the inner walls of the spout.

4. The structure defined in claim 1, said blades being spaced at regular intervals.

5. A doughnut cutter having a cylindrical spout through which dough may be extruded, a cut-off head spindle carried by said spout and projecting downwardly centrally therethrough, a cut-off head carried by said spindle and located in spaced relation below said spout, a reciprocating sleeve working in conjunction with said spout and head to cut off the dough formations extruded between the said throat and head and a device adapted to produce expansion joints at the central portions of dough formations formed, said device including a collar carried by said spindle immediately above said cut-off head and a multiplicity of outwardly extending vertical blades attached to said collar and projecting to points inwardly spaced from the inner wall of said spout.

6. A doughnut cutter having a cylindrical spout through which dough may be extruded, a cut-off head spindle carried by said spout and projecting downwardly centrally therethrough, a cut-off head carried by said spindle and located in spaced relation below said spout, a reciprocating sleeve working in conjunction with said spout and head to cut off the dough formations extruded between the throat and head and a device adapted to produce expansion joints at the central portions of dough formations formed, said device including a collar carried by said spindle immediately above said cut-off head and a multiplicity of circumferentially spaced radially projecting blades carried by said collar and projecting outwardly therefrom to points inwardly spaced from the inner wall of said spout.

7. The structure defined in claim 6, the spacing of said blades being regular.

WILLIAM R. COYNE.

References Cited in the file of this patent

UNITED STATES PATENTS

| Number | Name | Date |
| --- | --- | --- |
| 1,621,454 | Bleier | Mar. 15, 1927 |
| 2,092,160 | Hawerlander | Sept. 7, 1937 |